(12) United States Patent
Cho

(10) Patent No.: US 7,401,797 B2
(45) Date of Patent: Jul. 22, 2008

(54) VARIABLE TOE REAR SUSPENSION

(75) Inventor: Young-Gun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 168 days.

(21) Appl. No.: 11/285,468

(22) Filed: Nov. 22, 2005

(65) Prior Publication Data

US 2006/0108762 A1    May 25, 2006

(30) Foreign Application Priority Data

Nov. 23, 2004   (KR) ...................... 10-2004-0096419

(51) Int. Cl.
*B60G 3/012* (2006.01)
(52) U.S. Cl. ................. 280/124.128; 267/188; 267/189; 267/191
(58) Field of Classification Search .......... 280/124.128, 280/124.166, 124.152, 124.153; 267/183, 267/184, 185, 188, 189, 190, 191
See application file for complete search history.

(56) References Cited

U.S. PATENT DOCUMENTS

| | | | | |
|---|---|---|---|---|
| 2,607,610 A | * | 8/1952 | Allison | 280/5.513 |
| 2,988,374 A | * | 6/1961 | Boyles | 280/124.107 |
| 3,029,091 A | * | 4/1962 | Allison | 280/124.152 |
| 3,116,071 A | * | 12/1963 | Fiala et al. | 280/124.166 |
| 3,195,670 A | * | 7/1965 | Dunn | 180/359 |
| 4,146,249 A | * | 3/1979 | Paul | 280/124.15 |
| 4,203,615 A | * | 5/1980 | Cislo et al. | 280/124.106 |
| 4,542,920 A | * | 9/1985 | Kijima et al. | 280/5.524 |
| 4,652,009 A | * | 3/1987 | Ando et al. | 280/124.109 |
| 4,758,019 A | * | 7/1988 | Tucker-Peake et al. | 280/124.109 |
| 4,798,397 A | * | 1/1989 | Komiya | 280/124.152 |
| 5,071,156 A | * | 12/1991 | Kanai et al. | 280/124.143 |
| 5,102,160 A | * | 4/1992 | Stowe | 280/124.152 |
| 5,186,486 A | * | 2/1993 | Hynds et al. | 280/124.107 |
| 5,362,090 A | * | 11/1994 | Takeuchi | 280/124.152 |
| 5,468,018 A | * | 11/1995 | Redman et al. | 280/788 |
| 5,678,845 A | * | 10/1997 | Stuart | 280/124.116 |
| 5,810,383 A | * | 9/1998 | Anderson | 280/124.116 |
| 5,833,026 A | * | 11/1998 | Zetterstrom et al. | 180/360 |
| 5,895,063 A | * | 4/1999 | Hasshi et al. | 280/124.134 |
| 6,250,660 B1 | * | 6/2001 | Woo | 280/124.149 |
| 6,511,084 B1 | * | 1/2003 | Buhl et al. | 280/124.107 |
| 6,530,586 B2 | * | 3/2003 | Fader et al. | 280/124.106 |
| 6,533,301 B1 | * | 3/2003 | Catania | 280/124.13 |
| 6,604,270 B2 | * | 8/2003 | Kincaid et al. | 29/441.1 |
| 6,616,161 B2 | * | 9/2003 | Hamada et al. | 280/124.149 |
| 6,648,350 B1 | * | 11/2003 | Clements et al. | 280/124.106 |
| 6,905,130 B2 | * | 6/2005 | Few | 280/124.169 |
| 7,052,025 B2 | * | 5/2006 | Dagg et al. | 280/124.106 |
| 7,104,560 B2 | * | 9/2006 | Momiyama | 280/124.107 |

FOREIGN PATENT DOCUMENTS

DE     1630279 A      6/1971
JP     59008511 A  *  1/1984

* cited by examiner

*Primary Examiner*—Kevin Hurley
*Assistant Examiner*—Timothy Wilhelm
(74) *Attorney, Agent, or Firm*—Morgan Lewis & Bockius LLP

(57) ABSTRACT

A support block at a trailing arm and a stabilizer link that varies in contact state to the support block form a large toe-in during out-of phase movement of both wheels and form a small toe-in during in-phase movement of the wheels, thereby embodying an appropriate toe-in displacement according to the vehicle turn and forward motion, thus improving the vehicle driving characteristics.

3 Claims, 6 Drawing Sheets

VARIABLE TOE REAR SUSPENSION

CROSS-REFERENCE TO RELATED APPLICATIONS

The present application is based on, and claims priority from, Korean Application Serial Number 10-2004-0096419, filed on Nov. 23, 2004, the disclosure of which is hereby incorporated by reference herein in its entirety.

FIELD OF THE INVENTION

The present invention relates to a rear suspension designed to provide a desired toe orientation to the vehicle wheels according to the driving state of the vehicle. More particularly, the present invention relates to a variation of toe characteristics in a suspension system having a panel-type trailing arm depending on in-phase and out-of-phase movements of both wheels.

BACKGROUND OF THE INVENTION

A panel-type trailing arm differs in toe characteristic corresponding to the rise and fall of vehicle wheels according to the trailing arm's unique bending rigidity. Thus, when the vehicle moves vertically, a deformation of the trailing arm in a lateral direction of the vehicle affects the toe of wheels.

A stabilizer bar used for limiting vehicle roll is connected to a stabilizer link via a joint. The stabilizer link is attached to the trailing arm, knuckle, or the like by means of the joint.

When the vehicle makes a turn, a large toe-in is beneficial to the ground force of the tire whereas a small toe-in is beneficial to the vehicle stability during a vehicle forward motion. While cornering, vehicle roll occurs where both wheels undergo an out-of-phase movement. Therefore, the large toe-in is efficient when cornering, and the small toe-in is efficient in forward movement.

SUMMARY OF THE INVENTION

Embodiments of the present invention are provided to form a large toe-in during out-of-phase movement of the wheels and to form a small toe-in during in-phase movement of the wheels, thereby forming an appropriate toe-in angle corresponding to the turning or forward motion of the vehicle and thus improving the vehicle driving characteristics.

A variable toe rear suspension according to an exemplary embodiment of the invention includes a support block that protrudes out from a trailing arm toward the interior of the vehicle body. A stabilizer link is coupled to an inner portion of the trailing arm via a first joint. A stabilizer bar is connected to the stabilizer link via a second joint. The stabilizer link has a supportive contact portion, which contacts an inner portion of the support block while no torsion moment is applied to the stabilizer bar.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
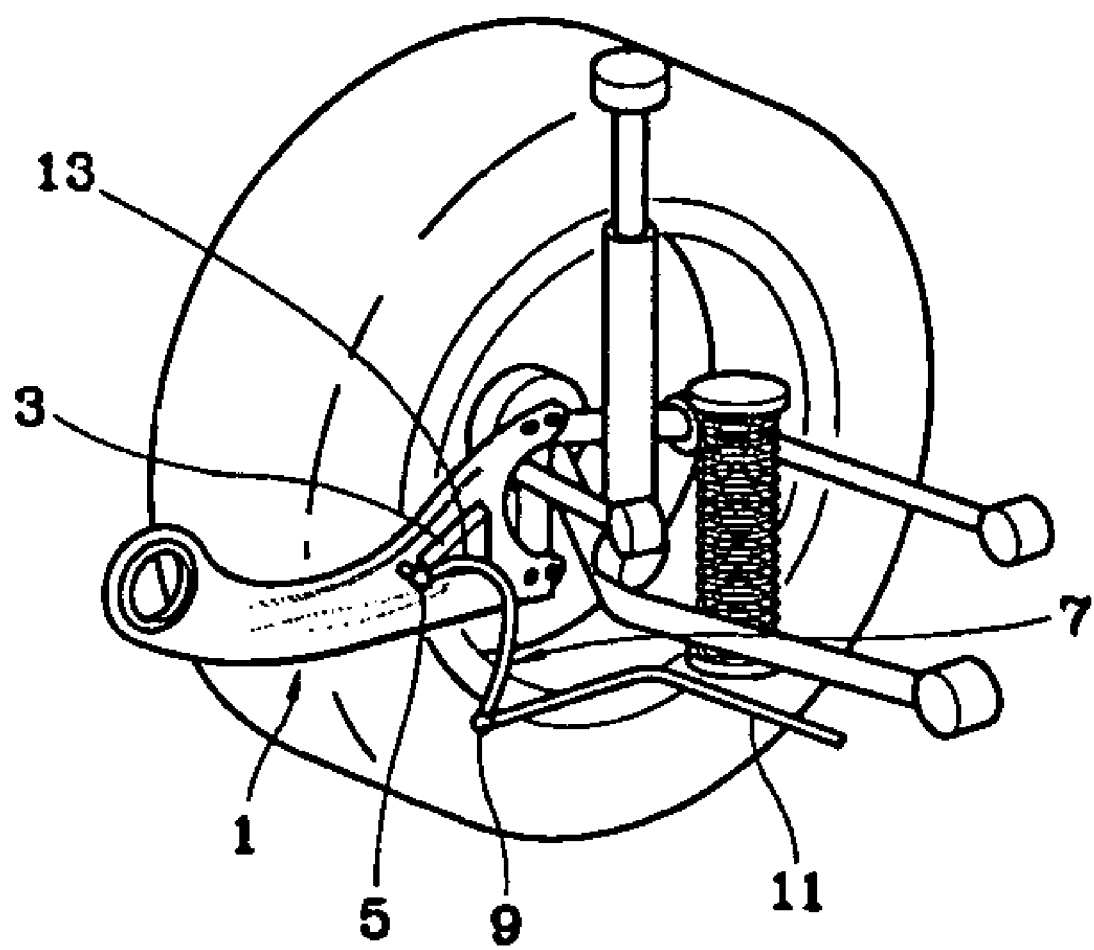
FIG. 1 depicts a variable toe rear suspension according to an embodiment of the present invention.

With reference to FIGS. 1 to 4, a support block 3 protrudes out from a trailing arm 1 toward the inside of the vehicle body. A stabilizer link 7 is coupled to an inner portion of trailing arm 1 via a first joint 5. A stabilizer bar 11 is connected to stabilizer link 7 via a second joint 9. Stabilizer link 7 has a supportive contact portion 13, which contacts an inner portion of support block 3 while no torsion moment is applied to stabilizer bar 11.

The area where supportive contact portion 13 and support block 3 can contact each other in support block 3 expands in a direction away from first joint 5. Support block 3 is, in other words, formed in a trapezoid shape with its width growing larger as it distances away from first joint 5. Support block 3 includes inclination surfaces at top and bottom portions thereof. The cross-section of support block 3 is also in the shape of a trapezoid enlarged in width as it moves away from first joint 5.

Figure 6:
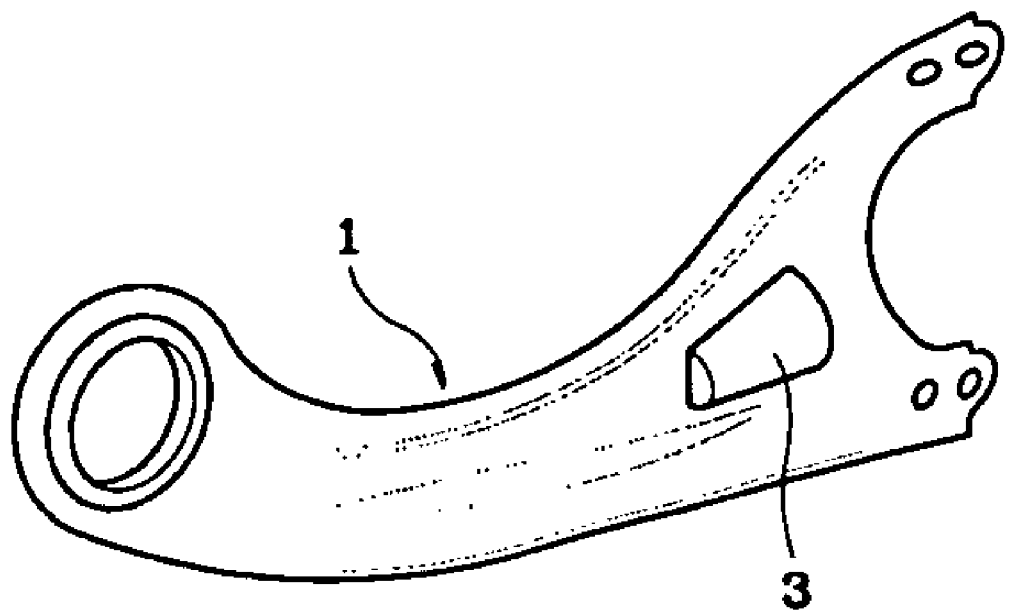
FIG. 6 depicts another embodiment of the support block.

In reference to FIG. 6, support block 3 according to another embodiment of the present invention has a cross-section including a chord that contacts trailing arm 1, and an arc that connects both ends of the chord. The lateral sides of support block 3 of FIG. 6 also expand as they move away from first joint 5.

The operation of the support block 3 having a trapezoid cross-section is described below with reference to accompanying FIGS. 1 to 5.

While one of the wheels is raised during a relative fall of the opposite wheel caused by a vehicle roll due to turning or the like, a torsion moment is applied onto stabilizer bar 11 through both stabilizer links 7. If the torsion moment is applied on stabilizer bar 11, one of stabilizer links 7 at both sides of stabilizer bar II pivots upward while the other pivots relatively downward. When stabilizer link 7 pivots, supportive contact portion 13 of stabilizer link 7 is detached from support block 3 (see FIG. 5).

Stabilizer link 7 and trailing arm 1 are connected to each other only via first joint 5. In such construction, trailing arm 1 has no supplementary component for strengthening the bending rigidity thereof. Therefore, trailing arm 1 is relatively largely bent in the lateral direction of the vehicle and the amount of toe-in is relatively greatly formed. This improves the ground force of the tire as well as the turning function of the vehicle.

Figure 2:
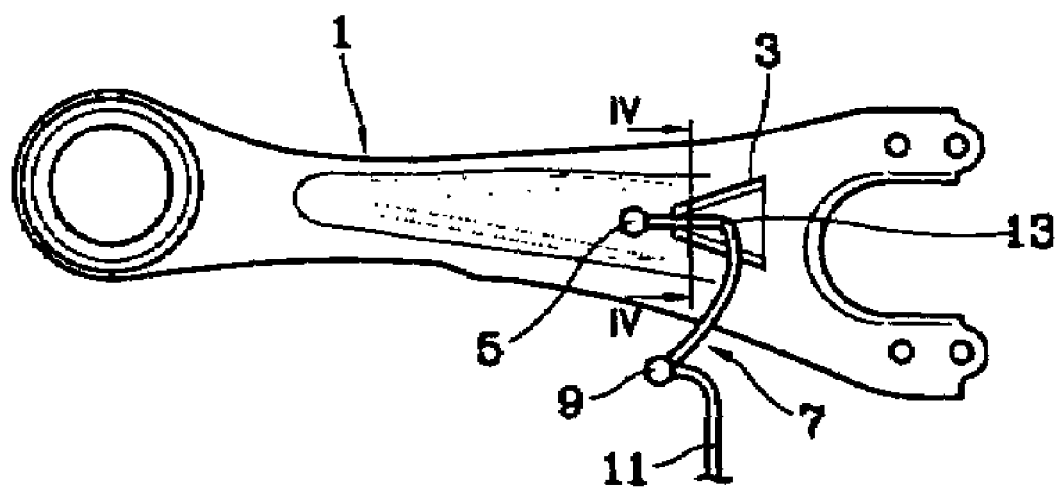
FIG. 2 depicts a structure of a trailing arm, stabilizer link and support block.
Figure 3:
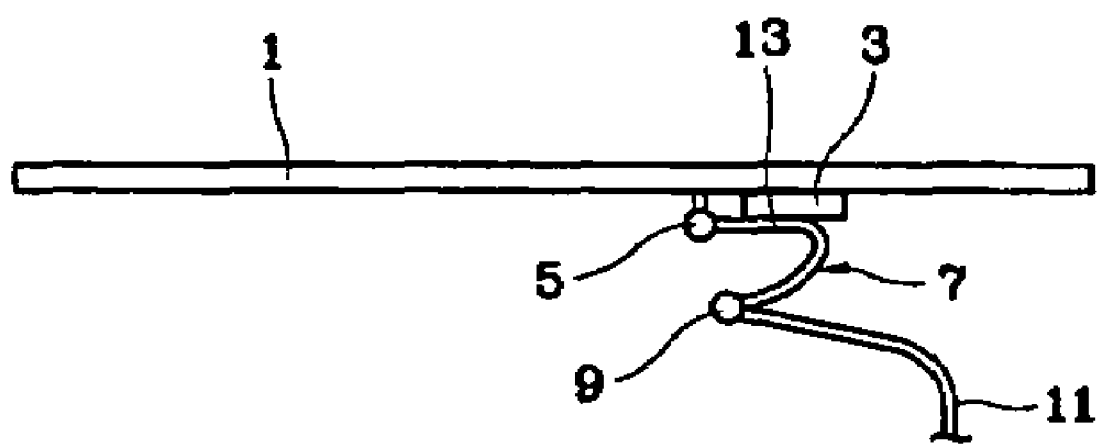
FIG. 3 depicts a view observed from the top of FIG. 2.
Figure 4:
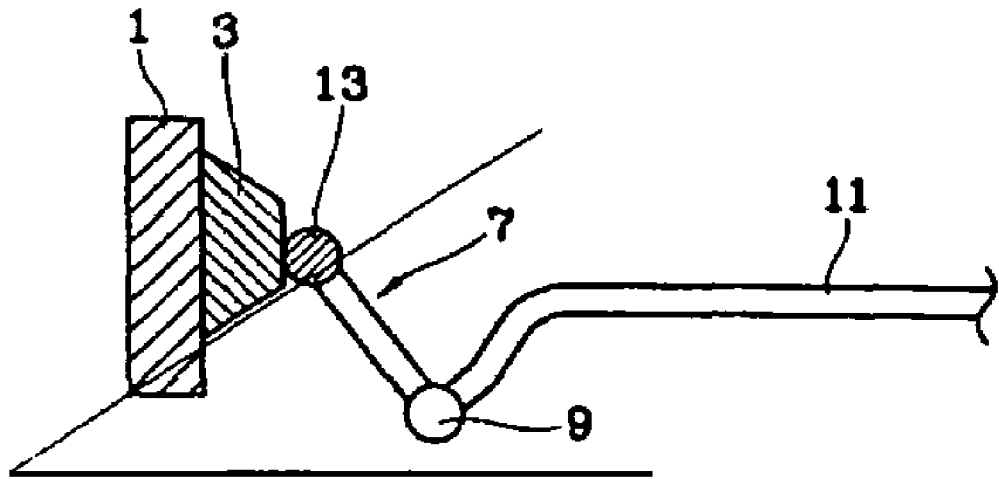
FIG. 4 is a cross-sectional view taken along line IV-IV of FIG. 2.
Figure 5:
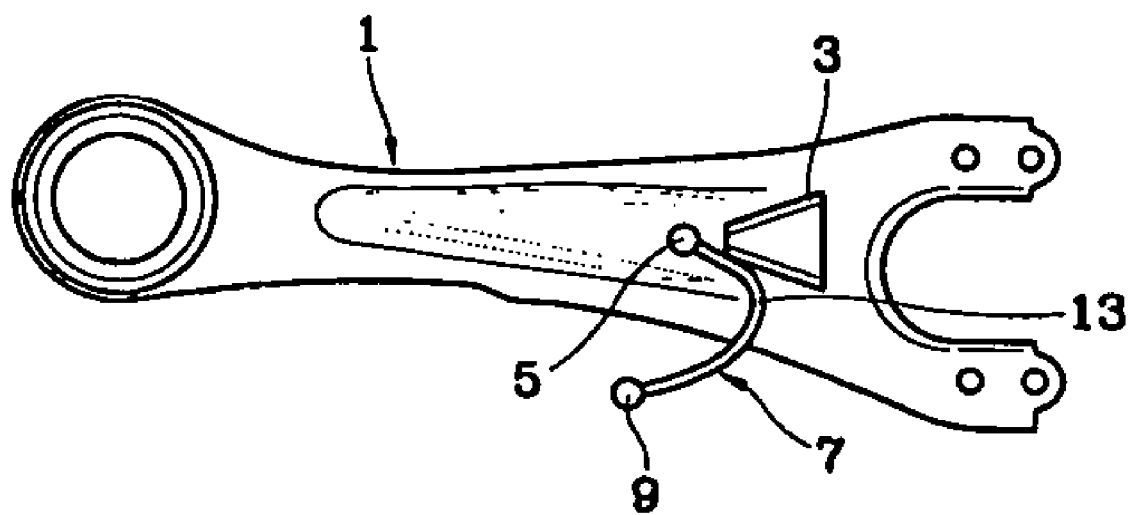
FIG. 5 depicts a state of the stabilizer link during a vehicle roll compared to FIG. 2.

In case both vehicle wheels move vertically in-phase (i.e., a forward driving), no torsion moment is applied onto stabilizer bar 11, and stabilizer link 7 connecting stabilizer bar 11 and trailing arm 1 moves along with trailing arm 1, thereby retaining the state of FIG. 2.

In FIG. 2, supportive contact portion 13 of stabilizer link 7 contacts support block 3, and stabilizer bar 11 serves to support trailing arm 1 through support block 3.

Accordingly, trailing arm 1 is reinforced in its bending rigidity in the lateral direction of the vehicle so that when both wheels move vertically, trailing arm 1 is slightly bent to form a relatively small toe-in angle, resulting in a vehicle stability during the forward motion.

As apparent from the foregoing, there is an advantage in that the support block at a trailing arm and the stabilizer link that varies in contact state with the support block form a large toe-in during out-of phase movement of both wheels and form a relatively small toe-in during in-phase movement of the wheels, thereby implementing an appropriate toe-in angle according to the vehicle turn and forward motion and improving the driving characteristics of the vehicle.

What is claimed is:

1. A variable toe suspension, comprising:
   a support block that protrudes out from a trailing arm toward an inside of a vehicle body;
   a stabilizer link coupled to an inner portion of said trailing arm via a first joint; and
   a stabilizer bar connected to said stabilizer link via a second joint, wherein said stabilizer link has a supportive contact portion, which contacts an inner portion of said support block when at least substantially no torsion moment is applied to said stabilizer bar, wherein an area where said supportive contact portion and said support block can contact each other in said support block expands in a direction away from said first joint; wherein said support block has a trapezoid shape that is expanded in width as said support block moves away from said first joint.

2. The suspension as defined in claim 1, wherein said support block includes inclination surfaces at top and bottom portions thereof.

3. A variable toe suspension, comprising:
   a support block that protrudes out from a trailing arm toward an inside of a vehicle body;
   a stabilizer link coupled to an inner portion of said trailing arm via a first joint; and
   a stabilizer bar connected to said stabilizer link via a second joint, wherein said stabilizer link has a supportive contact portion, which contacts an inner portion of said support block when at least substantially no torsion moment is applied to said stabilizer bar;
   wherein said support block is expanded in width as said support block moves away from said first joint and has a cross-section including a chord and arc, said chord contacting said trailing arm, and said arc connecting both ends of said chord.

* * * * *